H. P. HOLMAN.
TILE MAKING MACHINE.
APPLICATION FILED FEB. 28, 1908.

918,855.

Patented Apr. 20, 1909.
9 SHEETS—SHEET 4.

Witnesses:
John Enders.
Chas. H. Buell.

Inventor:
Harry P. Holman.
By Dyrenforth, Lee, Chritton & Wiles,
Attys.

H. P. HOLMAN.
TILE MAKING MACHINE.
APPLICATION FILED FEB. 28, 1908.

918,855.

Patented Apr. 20, 1909.
9 SHEETS—SHEET 6.

Witnesses:
John Enders
Chas. H. Buell

Inventor:
Harry P. Holman
By Dyrenforth, Lee, Chritton & Wiles
Attys.

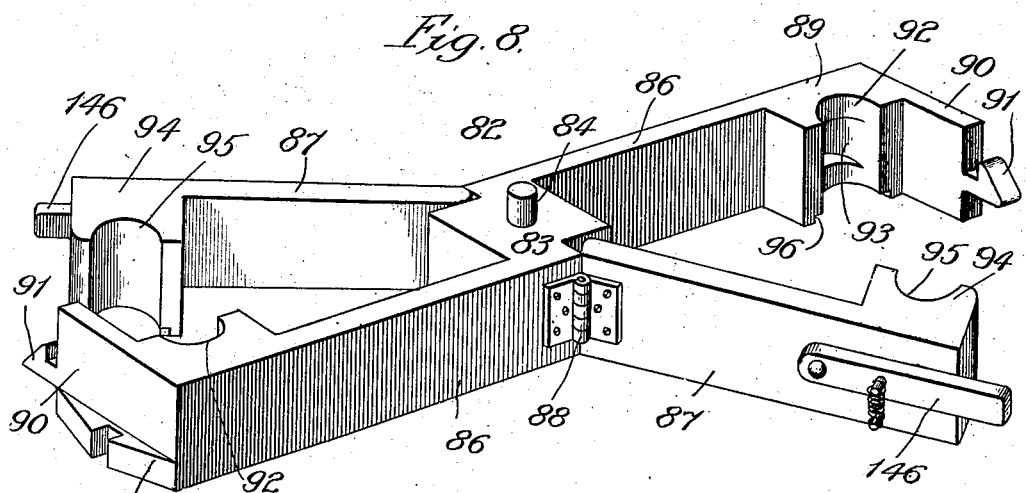

H. P. HOLMAN.
TILE MAKING MACHINE.
APPLICATION FILED FEB. 28, 1908.

918,855.

Patented Apr. 20, 1909.
9 SHEETS—SHEET 8.

Witnesses:
John Enders
Chas. H. Buell

Inventor:
Harry P. Holman.
By Dyrenforth, Lee, Chritton and Wiles,
Attys.

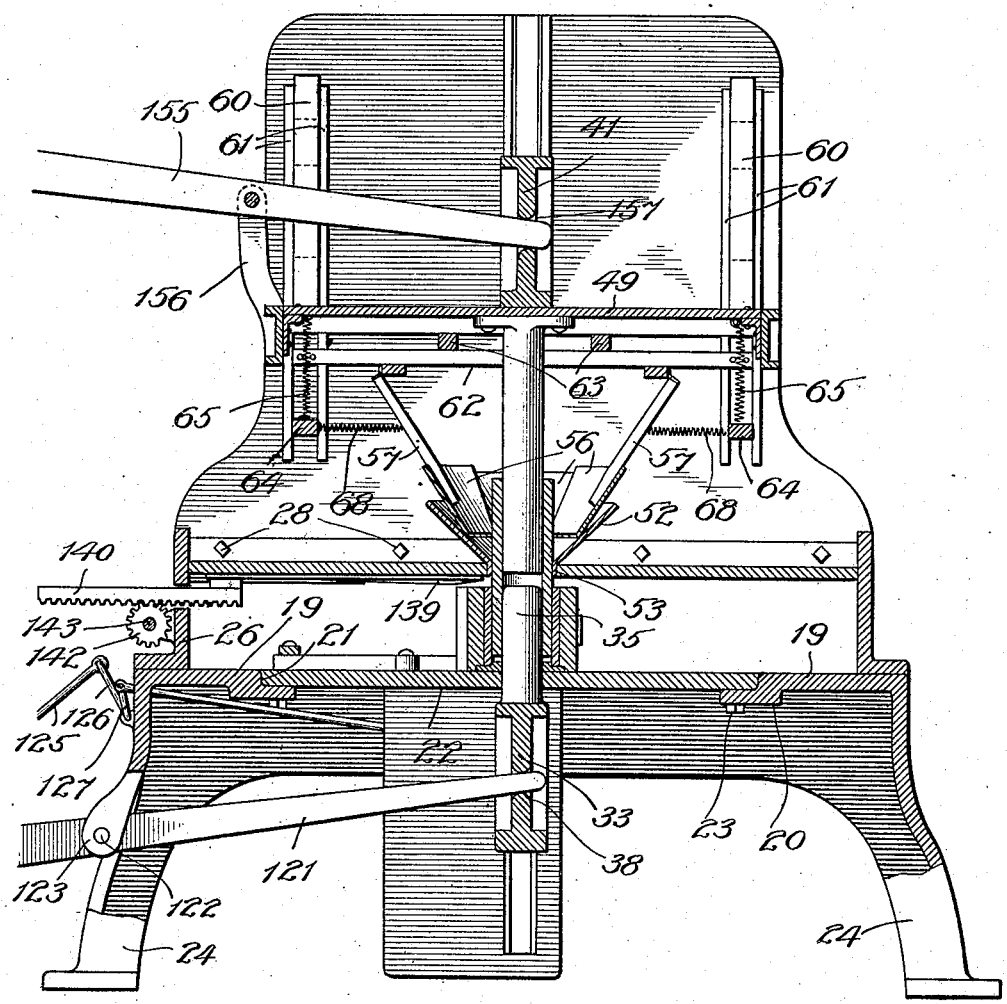

UNITED STATES PATENT OFFICE.

HARRY P. HOLMAN, OF UTICA, ILLINOIS.

TILE-MAKING MACHINE.

No. 918,855.　　　　　　Specification of Letters Patent.　　　Patented April 20, 1909.

Application filed February 28, 1908. Serial No. 418,200.

*To all whom it may concern:*

Be it known that I, HARRY P. HOLMAN, a citizen of the United States, residing at Utica, in the county of Lasalle and State of Illinois, have invented a new and useful Tile-Making Machine, of which the following is a specification.

My invention relates, more particularly, to improvements in machines for making tiles of cement, concrete and the like material; and my primary object is to provide a machine of the character set forth, which shall be comparatively economical of manufacture enabling it to be furnished to users at a relatively low cost; which shall be capable of rapidly forming tiling, and which, by its particular combination of parts, will be of simple construction and highly useful for the purpose for which such machines are intended to be used.

Figure 1:
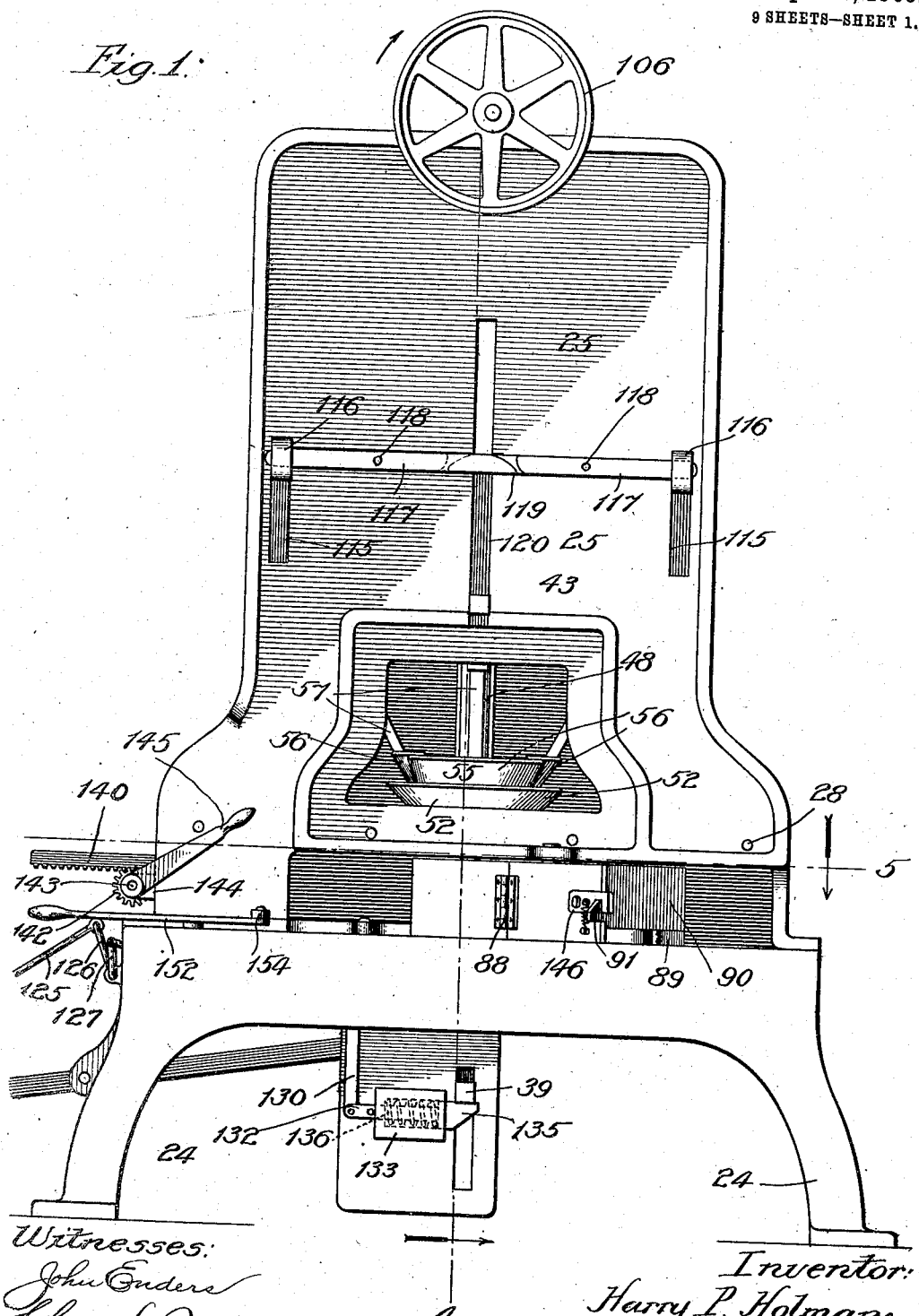
Figure 2:
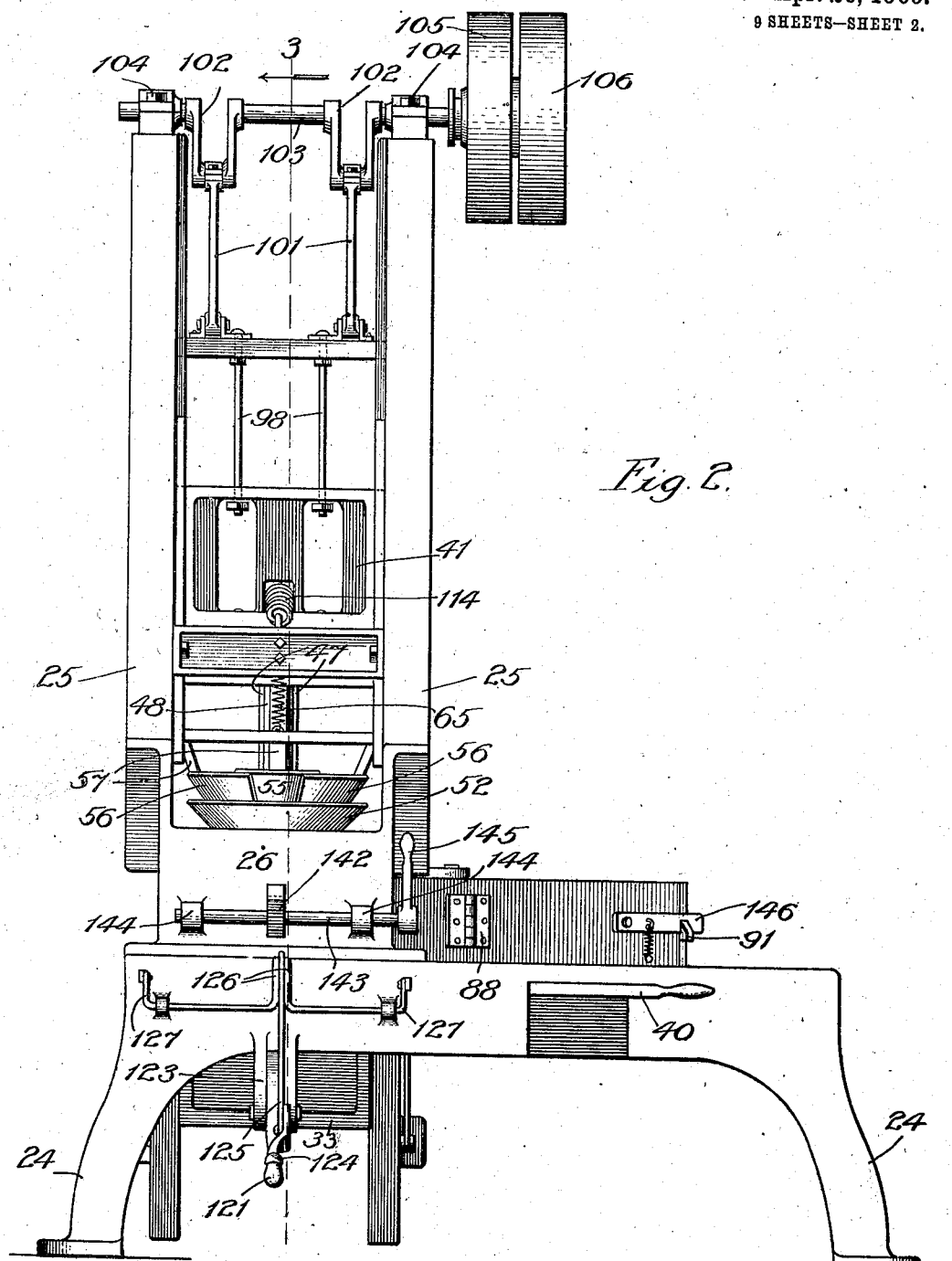
Figure 3:
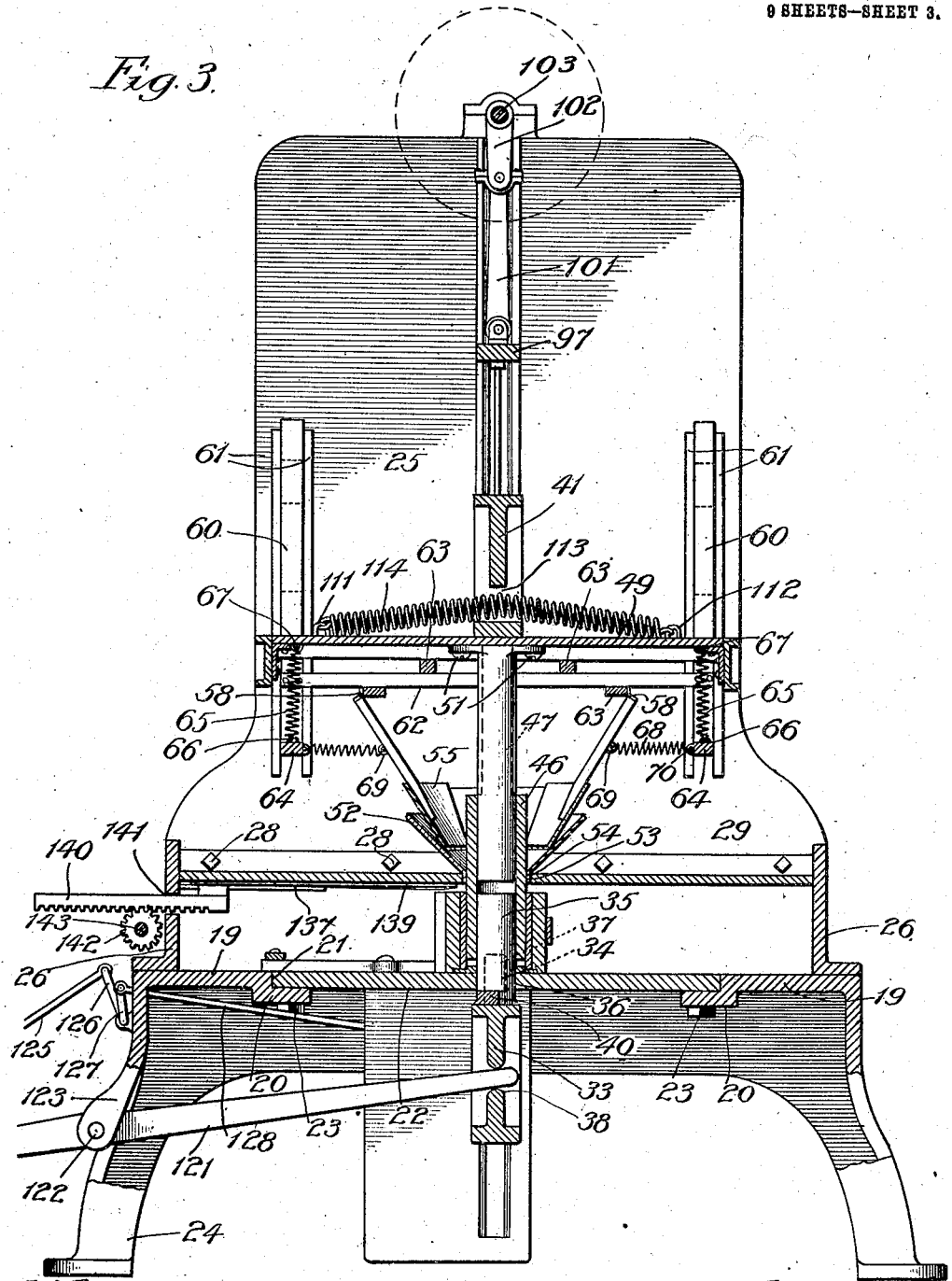
Figure 4:
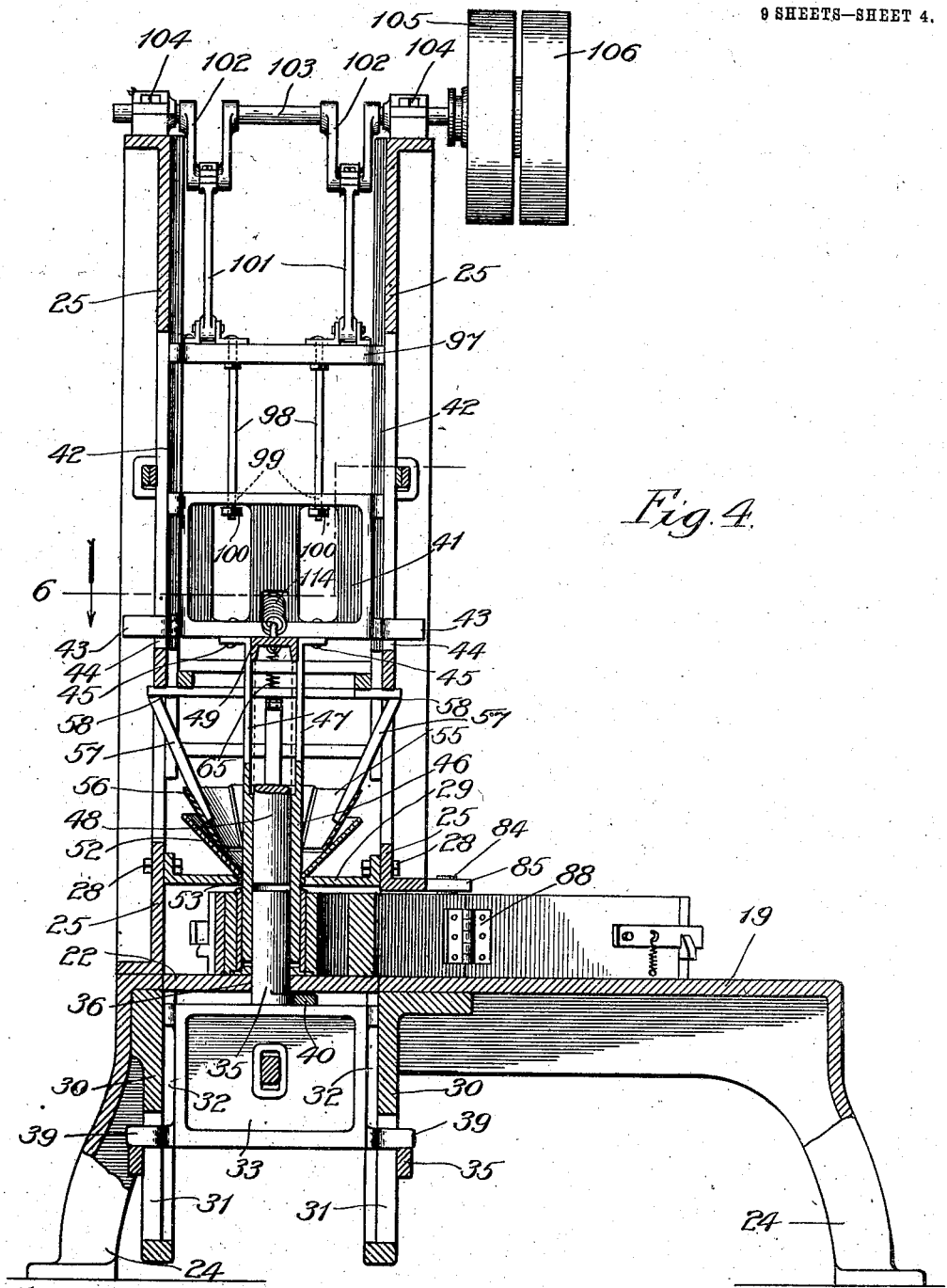
Figure 5:
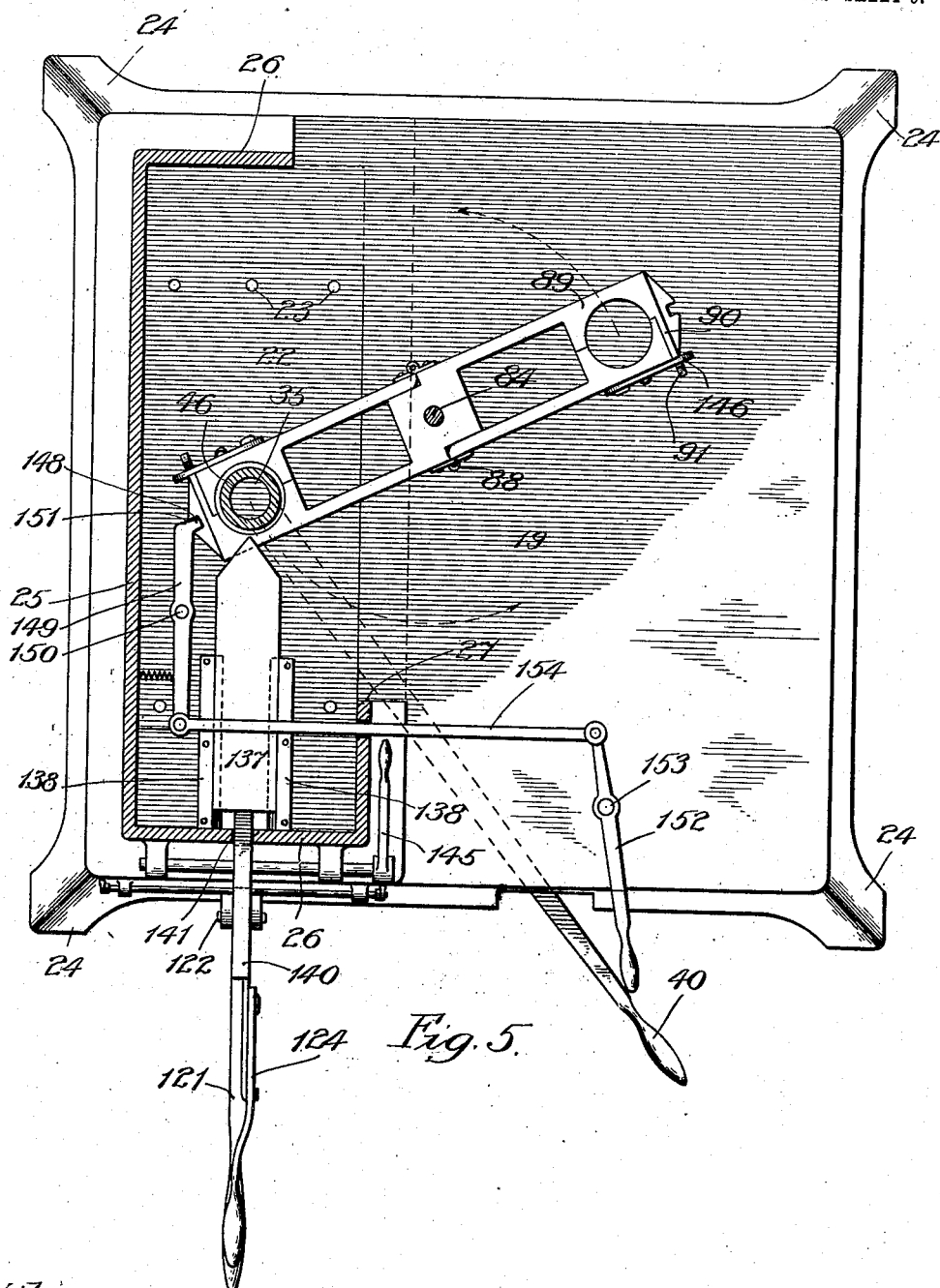
Figure 6:
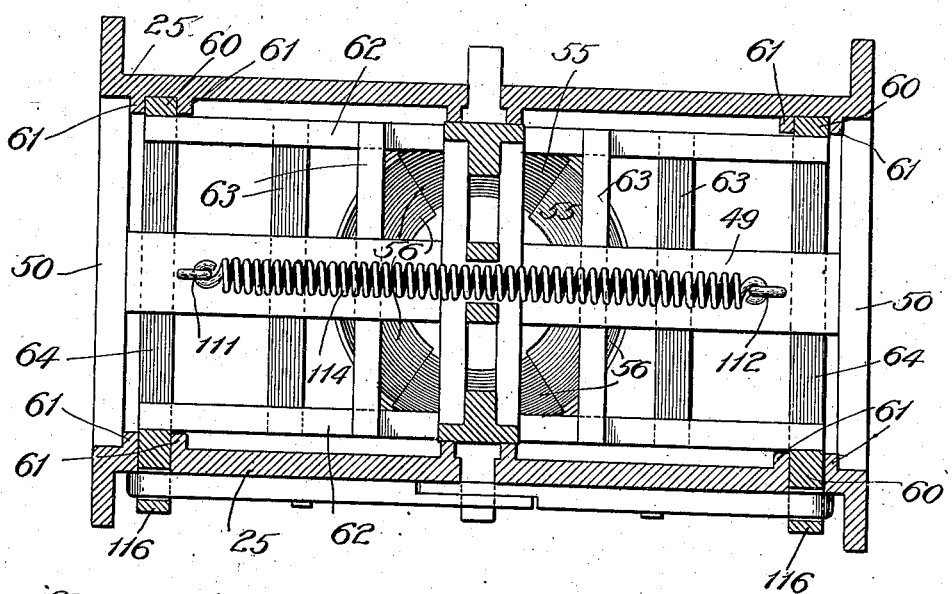
Figure 7:
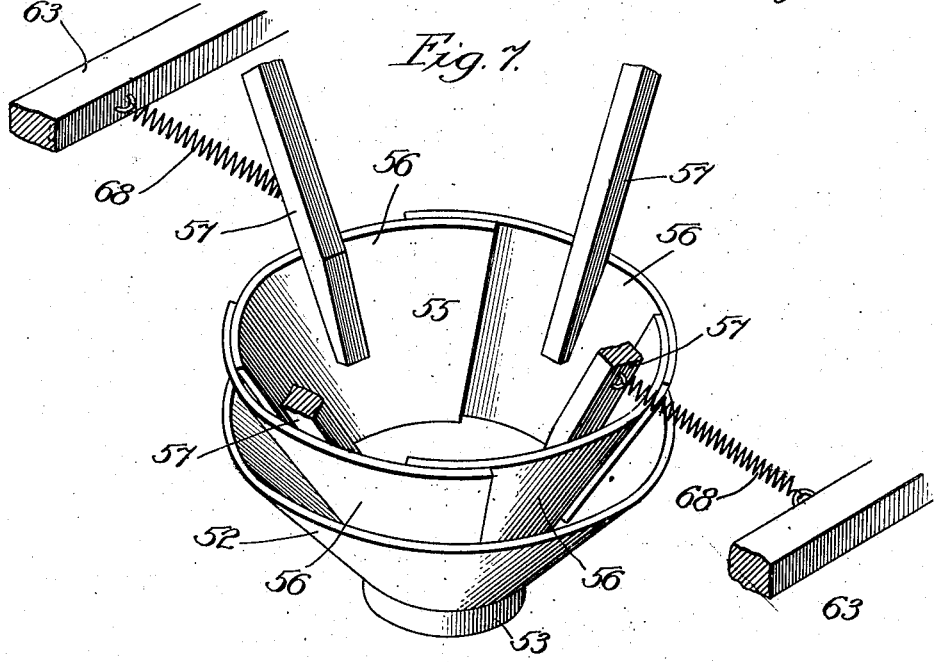
Figure 13:
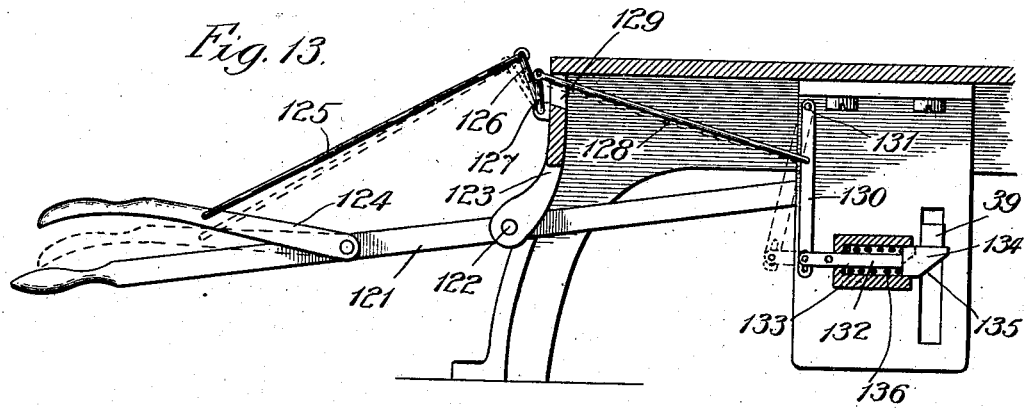
Figure 14:
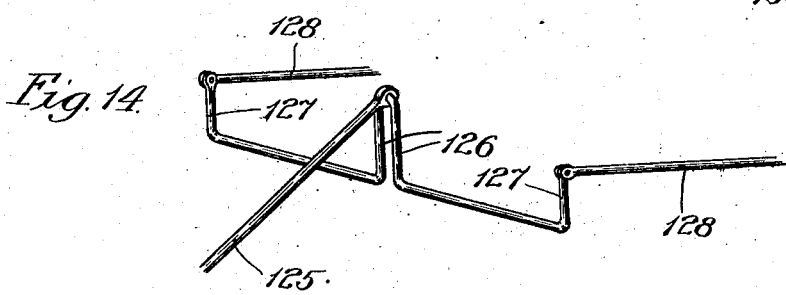
Figure 15:
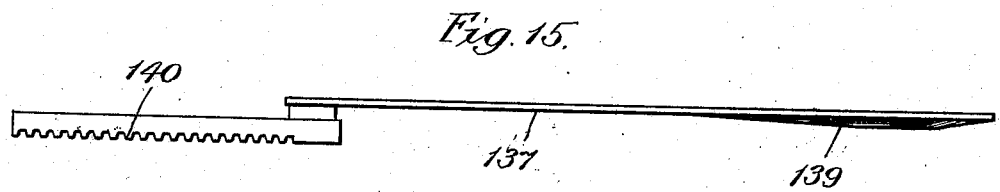
Figure 16:
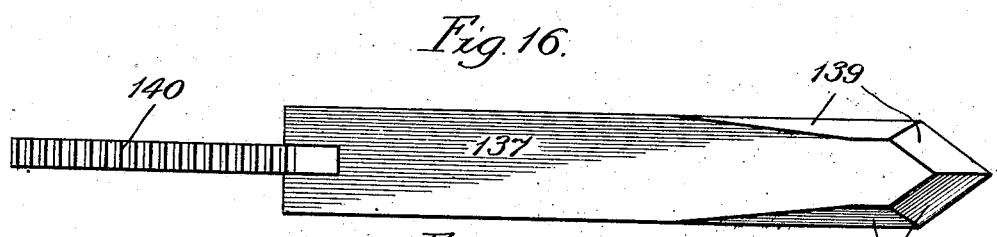
Figure 17:
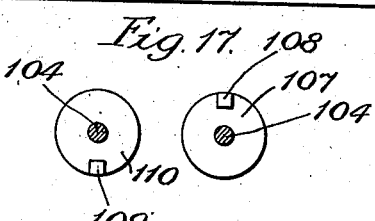

Referring to the accompanying drawings—Figure 1 is a view in side elevation of a power-shaft-operated machine constructed in accordance with my invention. Fig. 2 is a view in front elevation of the machine illustrated in Fig. 1. Fig. 3 is a section taken at the line 3 on Fig. 2 and viewed in the direction of the arrow. Fig. 4 is a section taken at the line 4 on Fig. 1 and viewed in the direction of the arrow. Fig. 5 is a section taken at the line 5 on Fig. 1 and viewed in the direction of the arrow. Fig. 6 is a section taken at the line 6 on Fig. 4 and viewed in the direction of the arrow. Fig. 7 is an enlarged broken perspective view of the fixed and coöperating expansible hoppers employed showing a portion of the supporting frame therefor. Fig. 8 is a perspective view of the revoluble mold-carrier. Fig. 9 is a top plan view of a mold employed in connection with the machine of the preceding figures, the mold being illustrated in open condition; and Fig. 10, a similar view of the mold shown in closed condition. Fig. 11, a broken view in side elevation of the mold shown in Figs. 9 and 10. Fig. 12 is a perspective view of a mold-base which may be used in connection with the molds referred to. Fig. 13 is a broken view in elevation, and partly in section, of the left-hand lower end of the machine illustrated in Fig. 1 showing the means for operating the core. Fig. 14 is a perspective view of a portion of the core-actuating lever-mechanism, illustrated in Fig. 13. Fig. 15 is a view in side elevation of the tile-cutter and its actuating rack. Fig. 16 is a bottom plan view of the cutter. Fig. 17 is a view, in the nature of a diagram, of the connection between the drive-shaft and driven-shaft; and Fig. 18 is a view similar to that of Fig. 3 showing my improvements as embodied in a hand-operated machine.

The supporting-frame of the machine comprises a bed-plate 19 having depressed flanges 20 about a central opening 21 in it, which receives a plate 22 secured to the flanges 20, as by bolts 23, the bed-plate being supported on legs 24. Rising from the bed-plate are uprights 25 which, with end plates 26, 26, form a rectangular frame having a vertical opening 27 extending through one side, through which the rotatable mold-holder, hereinafter described, extends. Bolted to these uprights, as indicated at 28, and spaced a distance above the plates 22, approximating the length of a tile which it is desired the machine shall make, is a flanged plate 29 above which the uprights 25 extend for purposes hereinafter disclosed. The plate 19 has secured to its under side two dependent spaced parallel brackets 30 provided with opposed slots 31, 31 extending from about their centers to near their lower edges, and slidably confined between these brackets in guides 32, 32 extending parallel with the slots 31, is a cross-head of general rectangular shape carrying on its upper end a stud 34, upon which a vertically disposed core 35 of cylindrical shape and working through an opening 36 in the plate 22, is journaled at an opening 37 therein, the cross-head 33 containing a central lever-receiving opening 38 connecting with lever-mechanism, hereinafter described, constructed to raise the cross-head for the purpose hereinafter set forth; and two lugs 39 projecting from its opposite ends through the opposed slots 31. The core 35 has an operating lever 40 fastened to it and extending into a position at one side of the machine, as represented in Fig. 5, to permit it to be operated for turning the core upon the cross-head for the purpose hereinafter explained.

A rectangular shaped casting 41, forming a head, slidable up and down in guides 42 on the uprights 25, and having lugs 43 extending through opposed vertical slots 44 in the uprights 25, has secured to it, as by bolts 45, to depend from it, a tamper 46, which, as represented, is of hollow, cylindrical shape with portions of its upper sides cut away to present arms 47, 47 at which the tamper 46 is secured to the member 41, as described. The tamper is so positioned on the member 41 as to cause it to be concentric with the core 35, and its interior diameter is such as to permit it to be raised and lowered to slip over the core when reciprocated, as hereinafter described.

A stationary tamper-guide, or core-post, 48, of a size approximating the size of the core 35, and likewise of cylindrical shape, rigidly depends from the center of a cross-beam 49 secured at its ends to two opposed braces 50 fastened between the uprights 25. This guide-post 48, which is preferably removably secured to the cross-member, as by screws 51, extends into the bore of the tamper 46 and terminates a short distance above the under side of the plate 29.

A stationary hopper 52, for receiving the material from which the tile is to be formed, is preferably permanently secured at a flange 53 thereon to the plate 29 at an opening 54 therein which is concentric with the tamper 46, but of slightly greater diameter than the latter, permitting the tamper to be raised and lowered through the bottom of the hopper. Coöperating with this hopper is an expansible hopper 55 forming means for feeding the material to be formed into the tiles, through the hopper 52 and into the molds hereinafter described. This supplemental hopper, which is most clearly represented in Fig. 7, is preferably formed of a plurality of overlapping frusto-conical shaped segmental sections 56, which are secured to the lower ends of arms 57 hinged at their upper ends, as represented at 58, to a vertically movable rectangular frame 59 composed of four vertical bars 60 sliding in guides 61 on the uprights 25 and connected together by parallel bars 62, 62, parallel cross-bars 63 joined at opposite ends to the bars 62, and bars 64 secured at their ends, below the bars 63, to the vertically movable uprights 60. Spiral springs 65 are fastened at their opposite ends to the bars 64 and cross-beam 49, as indicated at 66 and 67, respectively, and serve to normally hold the frame 59 in the raised position illustrated in Figs. 1, 2, 3, 4 and 7, and similar springs 68 are fastened at their opposite ends to arms 57 between the ends of the latter and to the bars 64, as indicated at 69 and 70, respectively, for normally tending to hold the segments 56 apart and thus constantly maintain the latter in engagement at their lower ends with the inner surface of the hopper 52, as the machine is operated in the manner hereinafter described.

A form of mold for use in forming a tile is represented at 71. It is constructed preferably of sheet metal and is of cylindrical form with its side split longitudinally as indicated at 72, whereby the tendency of the mold is to separate at its abutting edges, as illustrated in Fig. 9. The mold is provided with a clasp 73 for holding the edges of the mold in abutting relation for closing it. The clasp for this purpose may be of any suitable construction, the one shown comprising a yoke-strap 74 pivoted, at one end, to one of the lateral edges of the mold as indicated at 75, and pivoted at its free ends, as indicated at 76, to a cam-lever 77, which is pivoted to the other lateral edge of the mold, as indicated at 78, in a manner to cause the lateral opposed edges of the mold to be drawn together as represented in Fig. 10 and separated as illustrated in Fig. 9, by the manipulation of the lever 77 in a well-known manner. In connection with the mold 71 I prefer to use a mold-base 79, which has an opening 80 through it of slightly greater diameter than the thickness of the core 35, the mold-base being provided with an annular flange 81 extending about its periphery and forming a seat for the lower edge-portion of the mold 71.

In the machine illustrated, a plurality of the molds 71 are caused to be presented to the core 35 and tamper 46 through the medium of a mold-carrier or holder 82, which, in the form illustrated, comprises a hub-portion 83 carrying a stud 84 projecting vertically above its upper side, at which stud the holder is journaled in a bearing-extension 85 projecting from one of the uprights 25; rigid arms 86 extending from the hub 83 in opposite directions, and movable arms 87, 87 hinged to the hub 83, as indicated at 88. Each of the arms 86 is provided with a head 89 and a flange 90 extending therefrom and terminating in a catch 91, and each head 89 contains a recess 92 of semi-circular shape in cross-section in its side with a socket 93 therein, for a purpose hereinafter explained, the recesses 92 in these heads opening in opposite directions. Each of the hinged arms 87 has a head 94 containing a recess 95 similar to the recesses 92 with which they coöperate to form vertically extending mold-receiving openings at opposite ends of the holder 82 for receiving the molds and mold-bases, when assembled together, which latter fit at their flanges 81 in semi-circular grooves 96, 96 formed in the under sides of the heads 89 and 94 to be concentric with the recesses 92 and 95, respectively.

The tamper 46 in the power-shaft-operated construction is adapted to be raised through its connection with the power device and driven downward to strike a relatively hard blow by means of a spring-device, to produce the desired tamping of the material discharged into the mold, the following being a description of this portion of the machine: Confined to reciprocate up and down in the upper portions of the guides 42, is a cross-head 97 which has two rods 98 depending from it and passing slidably through openings 99 in the upper portion of the head 41, the lower ends of the rods 98 having nuts 100 confined on them to prevent the withdrawal of these rods through the openings 99. The cross-head 97 has pitmen 101 pivotally connected with it, which are journaled on crank-arms 102 carried by a shaft 103 journaled in bearings 104 secured to the uprights 25, the shaft 103 having journaled thereon two pulleys 105 and 106. The pulley 105 has fixed to it a disk 107 provided with a lug 108 which extends into the path of a lug 109 on a disk 110 fixed on the shaft 104, so that when the parts of the machine are in the position illustrated in Fig. 2, the lugs 108 and 109 engage with each other, and upon movement of the pulley 105 the cranks 102 are rotated a portion of a revolution, as hereinafter described, under the influence of this drive-pulley. Fastened at its opposite ends to the cross-member 49, as indicated at 111 and 112, and passing through an opening 113, in the member 41, is a stiff coil-spring 114, which, when the crank-arms 102 are turned to a position slightly beyond the vertical center of the shaft 103 by engagement of the lugs 108 and 109, causes the tamper 46 to be driven downward with considerable force.

In the operation of the machine the expansible hopper 55 is caused to rise while the tamper is moving downward, and descend while the tamper is moving upward, to cause the material deposited in the hoppers to be forced into the mold at the proper time. This feature of the machine being as follows: One of the uprights 25 contains two vertically disposed slots 115 at its opposite sides through which lugs 116, fixed on the two adjacent vertically movable uprights 60 of the frame 59, project into the path of the outer ends of oppositely extending arms 117 pivoted between their ends, as indicated at 118, to the upright 25, the inner ends of the arms overlapping as indicated at 119 and extending across the path of movement of one of the lugs 43 carried by the member 41 and projecting through a vertically extending slot 120 in the upright, whereby when the tamper is raised the lug 43 engages the inner crossed ends of the arms 117, rocking them on their pivots 118 and forcing th frame 59 downward, thereby pushing the hopper 55 downward in contact with the inner surface of the hopper 52, as hereinafter more fully set forth.

The core 35 is adapted to be raised and lowered in the opening 36 to permit of the removal of a filled mold and the introduction of the core into an empty one for replacing the filled mold, through the medium of lever mechanism which, as shown, is constructed as follows: An operating lever 121, extending at its free end through the opening 38 in the member 33, is fulcrumed between its ends, as indicated at 122, to a depending bracket 123 on the frame of the machine, and near its outer handle-equipped end has pivoted to it a lever 124, which is pivotally connected at a point between its ends to a link 125 pivoted to a double yoke 126, the outer upwardly extending arms 127 of which are pivoted to rearwardly extending rods 128 which pass through openings 129 (one only of which is shown) in the machine-frame, and connect at their inner ends with swinging bars 130 pivoted as indicated at 131 to the outer faces of the plates 30. These bars have sliding connection with spring-pressed plungers 132 confined on opposite sides of the plates 30 in housings 133, each plunger carrying at its free end a head 134 with a cam surface 135 on its under side, the heads normally extending at opposite sides of the plates into the path of movement of the lugs 39, as represented in Fig. 1. The springs 136 surrounding the plungers 132 are sufficiently strong to cause the heads 134 to normally extend into the path of the lugs 39 as described.

As illustrated in the drawings, the plate 29 is spaced a slight distance above the top of the mold-carrier 82, and movable in this space, across the top of the mold, and in contact with it, is a cutter-bar 137 which slides in guides 138 secured on the under side of the plate 29. The cutter-bar, which is relatively thick at its cutting end, as represented, and has its under side beveled as indicated at 139, and tapered toward the opposite end of the bar as represented, carries at its outer end a rack 140, which extends through an opening 141 in the adjacent frame-member 26, and meshes with a pinion 142 fixed on a shaft 143 journaled in brackets 144 on the frame-side 26 and carrying an operating handle 145 for moving the cutter back and forth across the top of the mold, as hereinafter described.

The operation of the machine is as follows: Assuming the core 35 to be withdrawn below the plate 22, the tamper 46 to be raised above the plate 29, and the hoppers to be empty, the first operation to be performed is that of securing the molds 21 in the holder 82. This is done by first seating the mold 71, while in the closed condition represented in Fig. 10, upon the mold-bases 79 at their flanges 81. The mold-bases with the molds thereon are then introduced into the headed ends of the carrier 82 in which they are locked by the engagement of spring-latch arms 146 with the adjacent catches 91 on the heads 89. The carrier is then swung about its pivot 84 until the hooked end 148 of an arm 149 fulcrumed between its ends as indicated at 150 on the bed-plate 22 and spring-actuated as represented, springs into a recess 151 in the adjacent end of the mold-carrier, which is so located as to cause the molds to be held in true concentric relation with the core 35 and tamper, when the lever 149 engages with it as described. The cutter-member 137 is then moved in its guides 138 by operating the handle 145 to cause it to extend across and cover the opening in the bottom of the hopper 52. Whereupon the hoppers may then be filled with the material from which the tiles are to be formed. The core 35 is then raised to extend up through the mold 71, which, as described, has been brought into the proper position for filling it, by depressing the lever 121 at its outer end which causes the frame 33 to be raised and with it the core 35, the lugs 39 on the frame 33, during the upward movement of the latter, engaging the cam surfaces 135 of the heads 134 and pushing the latter out of the path of movement of the lugs, the heads immediately springing back into positions below the lugs 39 to hold the frame 33 and core 35 in raised position until the heads 134 are withdrawn by operating the lever 124. With the core thus positioned in the mold, the cutter-bar 137 is then withdrawn from its position across the lower open end of the hopper 52, by operating the handle 145, whereupon some of the material contained in the hoppers drops therefrom into the mold 71 and around the core 35. The belt (not shown) through which power is communicated to the machine, assuming that it is in engagement with the pulley 106, is then shifted from this pulley to the pulley 105 with the result, assuming the crank-arms 102 to be at the limit of their upward movement when the machine is started, of causing the shaft 103 to be urned to the right in Fig. 1 by the engagement of the lugs 108 and 109 carried by the pulley 105 and shaft 104, respectively. It is, of course, understood that when the tamper 46 is at the limit of its upward stroke, as described, the member 41 carrying it is under great tension due to its connection with the spring 114, so that as soon as the cranks 102 are moved a slight distance beyond the vertical center, the spring 114 acting against the frame 41 causes it and the tamper 46 to descend with great force, this increase in the speed of the shaft 103 over the speed of the pulley 105 causing the lug 109 to move out of engagement with the lug 108 and to stay out of engagement therewith until the latter, by the rotation of the pulley 105 through the drive-belt, before referred to, again encounters it. The tamper on its downward stroke encounters the material previously deposited in the mold and tamps it therein against the mold-base.

When the tamper is up, as assumed in the beginning of the description of the operation of the machine, the hopper 55 is sunken deep into the stationary hopper 52 by reason of the engagement of the lugs 43 on the cross-head 41 with the crossed inner ends of the pivoted arms 117, which latter because of the engagement of their outer ends with the lugs 116 on the vertical slide-members 60 of the frame 59 causes the latter to be lowered against the resistance of the springs 65, thus carrying the arms 57 and the segments 56 downward, which latter move on one another and cause the hopper 55 to be partially telescoped as the frame moves downward. Thus as the tamper 46 descends, as described, the lug 43 on the cross-head 41 likewise descends, thus permitting the frame 59 and segmental hopper 55 to ascend to the position illustrated in Fig. 3, under the influence of the spring 65. The hopper 55 as it rises is caused to expand, the lower edges of its segments 56 moving in constant contact with the inner surface of the hopper 52 under the action of the springs 68, which latter tend to swing the arms 57 apart from each other on their hinges 58. After the lug 108 on the pulley 105 has again encountered the lug 109 on the shaft 104, the cranks 102 are again rotated and the tamper 46 raised as before described. As the tamper moves upward, the expansible hopper descends as described, and by its engagement with the inner surface of the hopper 52 and the contracting of its segments forces material, previously deposited in the hoppers, through the discharge-opening in the hopper 52 and into the mold 71 to lie upon that previously tamped, as described. The tamper 46, when the cranks 102 are again carried beyond the vertical center, is again caused to be driven downward against the material in the mold by the action of the spring 114, with the result of tamping this second deposit of material. These alternate feeding and tamping operations are continued until the mold 71 has been filled and tamped to the top with the material fed to it. As the filling of the mold progresses, the strokes of the tamper 46 must accordingly become successively shorter, and this is accomplished through the medium of the loose connection of the tamper-frame 41 with the bars 98, which causes the tamper to be raised to the same height each time it is drawn up by the operation of the cranks 102, but allows it to descend only so far as the resistance of the material in the mold permits it. When the mold 71 has been filled to the top and tamped as described, the power-belt is shifted from the pulley 105 to the pulley 106 to cause the machine to stop while the tamper is withdrawn from the mold. The operating lever 145 is then rocked to move the cutter-bar 137 across the top of the molded material, the shape of the cutting surfaces of the bar, as described, causing the molded material to be smoothed off at its end to make a clean cut. In this operation, the thickened portion of the cutter-bar passes beyond the core 35 and the thinner portion is moved over it, thereby permitting the mold-holder to be rotated, as hereinafter described, without contacting with the bar 137. The core may then be loosened from the molded material, to prevent clinging of it to the core, by moving the handle 40 back and forth, thereby turning the core 35 upon the stud 34. The core is then withdrawn from the mold 71 by depressing the lever 124 to draw the plunger-heads 134 out of engagement with the lugs 39, whereupon the sliding member 33 is free to descend, which in doing so turns the lever 121 on its fulcrum. A lever 152 which is fulcrumed between its ends on the bed-plate 19 as represented at 153, and has pivotal connection with the lever 149 through the medium of a connecting link 154, is then moved to the left in Fig. 5, with the result of withdrawing the shouldered end 148 of the lever 149 from the recess 151. The carrier 82 may then be swung upon its pivot 84 to move the mold, filled as described, into a position on the bed 19 in which the heads 89 and 94 encircling it may be unfastened and separated, thereby permitting the head 94 to be swung away from its companion head 92, and the mold-base 79 and mold 71, with the molded tile on it, to be withdrawn from the carrier and slid along the bed-plate. The clasp 73 of the mold is then unlocked to relieve the tension upon the spring-metal mold-sides, whereby the latter spring away from the molded tile permitting the mold to be lifted clear of the tile, which latter may then be removed from the bed to a suitable place for drying it while supported on the base 79. The holder 82 may then be rotated to bring the other mold into position for forming a tile in it, and the operation heretofore described of molding a tile is repeated. It is to be understood that a single mold may be used in connection with the machine, or that the carrier may be formed so as to permit any desirable number of molds to be supported thereon and moved into successive registration with the core and tamper.

The machine illustrated in Fig. 18, instead of being shaft-drive-operated, is adapted to be manually operated. In the case of this machine the mechanism of the machine illustrated in the preceding figures and located above the frame 41 is eliminated, and likewise the spring 114 for driving the tamper, and, in lieu thereof, a hand-operated lever 155 fulcrumed between its ends on brackets 156 secured to the machine-frame, and extending at its inner end through a slot 157 in the frame 41, is substituted. The operation of the machine of Fig. 18 is the same as that of the preceding figures, except that the tamper is raised and lowered by moving the lever 155 up and down, instead of being raised by connections with a power-shaft and lowered by a spring as described of the construction of the preceding figures.

An important feature of my machine is that of causing each charge of material deposited in the mold to be tamped into intimate contact with the mold-base, mold and core, to pack it sufficiently hard to form a stable and strong tile.

A machine constructed in accordance with my invention is of simple construction and easily operated to form tiles, thereby rendering it of especial use to those who are not highly skilled as operators.

By providing the removable core 35, the plates 22 and 29, the latter with the hopper 52 secured thereon, the removable tamper 46 and core-post 48, and the removable mold-holder 82, these parts may have substituted for them others of different sizes for making tiles of smaller or larger diameter, and thus the machine, by reason of these features of construction, is adapted to make tiles of any size desired.

What I claim as new, and desire to secure by Letters Patent, is—

1. In a machine of the character set forth, the combination with a mold, a tamper and a hopper, of an expansible hopper formed of overlapping sections slidable with relation to each other and coöperating with the inner surface of said first-named hopper.

2. In a machine of the character set forth, the combination of a mold, a tamper and a hopper, of an expansible hopper formed of overlapping sections slidable upon each other and projecting into and coöperating with the inner surface of said first-named hopper, and means for holding the lower edges of said sections in contact with the inner surface of said first-named hopper, for the purpose set forth.

3. In a machine of the character set forth, the combination with a mold, a tamper and a hopper, of a vertically movable support mounted on the machine, an expansible hopper supported on said support and composed of overlapping sections slidable on each other and coöperating with said first-named hopper, and means for actuating said support, for the purpose set forth.

4. In a machine of the character set forth, the combination with a mold, a tamper and a hopper, of a support mounted on the machine to adapt it to be moved vertically, an expansible hopper supported on said support and formed of overlapping sections slidable on each other and coöperating at their lower edges with the inner surface of said first-named hopper, and means for raising said support.

5. In a machine of the character set forth, the combination with a mold, a tamper and a hopper, of a support mounted on the machine to adapt it to be moved vertically, an expansible hopper movably supported on the support and comprising overlapping sections slidable upon each other and coöperating with the inner surface of said first-named hopper, and means for holding the lower edges of the expansible hopper against the inner surface of said first-named hopper, for the purpose set forth.

6. In a machine of the character set forth, the combination with a mold, a tamper and a hopper, of a support mounted on the machine to adapt it to be moved vertically, an expansible hopper formed in overlapping sections movable one upon the other and coöperating with the inner surface of said first-named hopper, arms pivoted to said support and connected with said sections, and means tending to swing the arms apart, for the purpose set forth.

7. In a machine of the character set forth, the combination with a mold, tamping means and a hopper, of an expansible vertically movable hopper formed of overlapping sections movable one upon the other and coöperating with the inner surface of said first-named hopper, and means for moving the expansible hopper in contact with the inner surface of said first-named hopper while the tamper is moving upward, for the purpose set forth.

8. In a machine of the character set forth, the combination with a mold, tamping means and a hopper, of an expansible vertically movable hopper formed of overlapping sections movable one upon the other and coöperating at their lower edges with the inner surface of said first-named hopper, and means actuated by the tamping means for actuating the expansible hopper, for the purpose set forth.

9. In a machine of the character set forth, the combination with a mold, tamping means and a hopper, of an expansible hopper formed of overlapping sections slidable one upon the other and coöperating with the inner surface of said first-named hopper, a vertically movable support for the expansible hopper, and means actuated by said tamping means for reciprocating said support and expansible hopper, for the purpose set forth.

10. In a machine of the character set forth, the combination with a mold, tamping means and a hopper, of an expansible hopper formed of overlapping sections slidable one upon the other and coöperating with the inner surface of said first-named hopper, a vertically movable support for the expansible hopper, and lever mechanism constructed and arranged to extend into the path of movement of the tamping means and engage with said support, for the purpose set forth.

11. In a machine of the character set forth, the combination with a mold, a tamper and a hopper, of a support mounted on the machine to adapt it to be moved vertically, an expansible hopper movably supported on the support to coöperate with said first-named hopper, and springs connected with the machine and with the expansible hopper for maintaining constant engagement of the lower edges of the last-named hopper with the inner surface of the first-named hopper, for the purpose set forth.

12. In a machine of the character set forth, the combination with a mold, a tamper and a hopper, of a support comprising a frame composed of vertical slide-members slidably confined on the frame of the machine, a plurality of bars connecting said slide-members together, and a plurality of cross-members secured to said bars, bars supported below said first-named bars, a sectional hopper coöperating with said first-named hopper, arms pivoted to said first-named bars and cross-members and carrying said hopper-sections, and springs connected with the arms and said last-named bars, for the purpose set forth.

13. In a machine of the character set forth, the combination with a mold, tamping means and a hopper, of an expansible hopper coöperating with said first-named hopper, a vertically movable support for the expansible hopper, means tending normally to hold the support and expansible hopper in one position, and means actuated by the tamping means for moving the support and expansible hopper to opposed position, for the purpose set forth.

14. In a machine of the character set forth, the combination with a mold, tamping means and a hopper, of an expansible hopper coöperating with said first-named hopper, a vertically movable support for the expansible hopper, means for normally holding the support and expansible hopper in raised condition, and means operated by the tamping means for lowering the support and expansible hopper, for the purpose set forth.

15. In a machine of the character set forth, the combination with a mold, tamping means and a hopper, of an expansible hopper coöperating with said first-named hopper, a vertically movable support for the expansible hopper, springs secured to the machine and to the support tending normally to hold the support and expansible hopper in raised condition, and means actuated by the tamping means for lowering the support and expansible hopper against the resistance of the springs, for the purpose set forth.

16. In a machine of the character set forth, the combination with a mold, tamping means and a hopper, of an expansible hopper coöperating with said first-named hopper for pushing material from said hopper into the mold, a vertically movable support, arms, carried by said support and connected with said expansible hopper and arms pivoted to the machine and overlapping at their inner ends at which they extend into the path of movement of the tamping mechanism, the outer ends of the arms engaging with the support, for the purpose set forth.

17. In a machine of the character set forth, the combination with a mold, tamping means and a hopper, of an expansible hopper coöperating with said first-named hopper for pushing material from said hopper into the mold, a vertically movable support for the expansible hopper, springs tending normally to hold the support and expansible hopper in raised condition, and arms pivoted to the machine and overlapping at their inner ends, at which they extend into the path of movement of the tamping mechanism, the outer ends of the arms engaging with the support, for the purpose set forth.

18. In a machine of the character set forth, the combination with a mold supported on the machine, of a vertically movable support, a core carried by the support, lever mechanism for moving the support, means normally extending into the path of movement of said support for automatically releasably locking the core in position in the mold, and lever mechanism coöperating with said locking means, for the purpose set forth.

19. In a machine of the character set forth, the combination with a mold, of a vertically movable support, a core carried by the support, lever mechanism for moving the support, spring-pressed plungers mounted on the machine to normally extend into the path of movement of said support and releasably lock the same while in raised position, and means for withdrawing the plungers from operative engagement with the support, for the purpose set forth.

20. In a machine of the character set forth, the combination of a mold supported on the machine, a support slidably mounted on the machine, a core journaled on said support and adapted to extend into the mold when the support occupies a raised position, and an operating handle secured to the core, for the purpose set forth.

21. In a machine of the character set forth, the combination of a movable mold-holder, a core constructed and arranged to be moved into and out of the mold, and means for releasably locking the holder in position on the machine to cause a mold carried thereby to be operatively positioned relative to the core, for the purpose set forth.

22. In a machine of the character set forth, the combination of a frame comprising a suitably supported bed-plate, uprights rising from said plates, and a second plate spaced above the bed-plate, said plates being provided with openings through them, a mold-carrier extending into the space between the two plates and carrying a mold, a core supported on the machine to be moved up and down through the opening in the bed-plate and into and out of the mold, a hopper on said second plate to discharge material through said last referred-to plate into the mold, a tamper slidably mounted on the machine to be reciprocated through the hopper and upper plate and into the mold between the sides of the latter and the core, and means for reciprocating the tamper.

23. In a machine of the character set forth, the combination with a mold, and means for feeding material to the mold, of means for dressing the material at the top of the mold comprising a bar having its dresser end thickened and diminishing in thickness toward its opposite end, with the marginal portions of its under surface beveled, and means for reciprocating the bar; all as substantially described.

HARRY P. HOLMAN.

In presence of—
 LOTTIE B. TURNER,
 MAY B. HOLMAN.